United States Patent
Tipton

Patent Number: 6,029,629
Date of Patent: Feb. 29, 2000

[54] CONSTANT FUEL-PUMP-INLET PRESSURE SYSTEM

[75] Inventor: Larry J. Tipton, Kokomo, Ind.

[73] Assignee: Federal-Mogul World Wide, Southfield, Mich.

[21] Appl. No.: 09/178,969

[22] Filed: Oct. 26, 1998

[51] Int. Cl.$^7$ .................................................. F02M 7/00
[52] U.S. Cl. ........................ 123/447; 123/510; 123/516; 137/449
[58] Field of Search .................................. 123/447, 510, 123/516, 518, 514, 519, 520; 137/449, 550

[56] References Cited

U.S. PATENT DOCUMENTS

| | | | |
|---|---|---|---|
| 1,435,117 | 11/1922 | Guay | 123/510 |
| 3,105,478 | 10/1963 | Lyon | 123/447 |
| 3,583,418 | 6/1971 | Marioneaux | 137/449 |
| 4,320,734 | 3/1982 | Balachandran . | |
| 4,372,847 | 2/1983 | Lewis | 123/510 |
| 4,532,895 | 8/1985 | Kueny | 123/447 |
| 4,602,605 | 7/1986 | Adkins . | |
| 4,730,591 | 3/1988 | Gohara . | |
| 4,809,666 | 3/1989 | Baltz . | |
| 5,085,198 | 2/1992 | Bartlett . | |
| 5,095,880 | 3/1992 | Ricks | 123/516 |
| 5,115,784 | 5/1992 | Mito . | |
| 5,119,790 | 6/1992 | Olson . | |
| 5,195,494 | 3/1993 | Tuckey . | |
| 5,213,083 | 5/1993 | Glassey | 123/447 |
| 5,253,628 | 10/1993 | Brown . | |
| 5,363,827 | 11/1994 | Siekmann | 123/509 |
| 5,368,001 | 11/1994 | Roche . | |
| 5,389,245 | 2/1995 | Jaeger . | |
| 5,551,405 | 9/1996 | Thompson . | |
| 5,579,740 | 12/1996 | Cotton . | |
| 5,605,177 | 2/1997 | Ohashi . | |
| 5,746,184 | 5/1998 | Ekstam . | |

*Primary Examiner*—Carl S. Miller
*Attorney, Agent, or Firm*—Howard & Howard

[57] ABSTRACT

A fuel filter assembly 16 for a fuel system for an internal combustion engine 10 which comprises a fuel filter housing 16 supporting a filter material 20 in a filter chamber 18 for disposition in a fuel line between a fuel tank 12 and an injector pump 14, and a fuel reservoir 22 disposed downstream from the filter chamber 18 for storing a volume of fuel. The assembly is characterized by an inlet valve 24 controlling fuel flow between the filter chamber 18 and the reservoir 22 for maintaining a predetermined volume of fuel in the reservoir 22 to provide a substantially constant fuel pressure to the injector pump 14. A float 26 is disposed in the reservoir 22 for opening the valve 24 in response to the fuel being below the predetermined volume and closing the valve 24 in response to the fuel being above the predetermined volume.

12 Claims, 1 Drawing Sheet

CONSTANT FUEL-PUMP-INLET PRESSURE SYSTEM

BACKGROUND OF THE INVENTION

1. Field of the Invention

The subject invention relates to a system for supplying fuel to a diesel engine via an injector pump.

2. Description of the Prior Art

As is well known in the art, a fuel pump supplies fuel to the injectors of a diesel engine. However, in some instances, the fuel pump is very sensitive to the fuel pressure of the fuel being supplied to the pump. Variations in fuel pressure being supplied to the pump affects the metering of the fuel, which, in turn, affects the engine performance and emissions.

Although various combinations of components are known in the prior art, none anticipate the solution claimed herein. The U.S. Pat. No. 4,385,615 to Keane discloses a float and reservoir for supplying fuel to the engine but no filter immediately upstream. On the other hand, the U.S. Pat. No. 4,478,197 to Yasuhara discloses a filter but no reservoir immediately downstream. The U.S. Pat. No. 4,543,938 to Szlaga discloses the combination of a filter and reservoir but the reservoir is upstream of the filter. The U.S. Pat. No. 5,095,880 to Ricks discloses a reservoir downstream of the filter but without a valve to maintain a predetermined volume or level of fuel in the reservoir.

SUMMARY OF THE INVENTION AND ADVANTAGES

An internal combustion engine and fuel supply system comprising an internal combustion engine, a fuel tank for storing and supplying fuel to the engine, and a fuel line for conveying fuel from the fuel tank to the engine. An injector pump is disposed in the fuel line for pumping fuel from the fuel tank to the engine. A fuel filter material is disposed in the fuel line between the fuel tank and the injector pump and a fuel reservoir is disposed in the fuel line between the filter material and the injector pump for storing a volume of fuel. The system is characterized by a valve controlling fuel flow between the filter material and the reservoir for maintaining a predetermined volume of fuel in the reservoir to provide a substantially constant fuel pressure to the injector pump.

Accordingly, the system provides a constant fuel pressure to the fuel pump regardless of fuel flow requirements.

BRIEF DESCRIPTION OF THE DRAWINGS

Other advantages of the present invention will be readily appreciated as the same becomes better understood by reference to the following detailed description when considered in connection with the accompanying FIG. 1 which shows a cross section of the filter-reservoir combination and the remainder of the system in schematic form.

DETAILED DESCRIPTION OF THE PREFERRED EMBODIMENT

Figure 1:
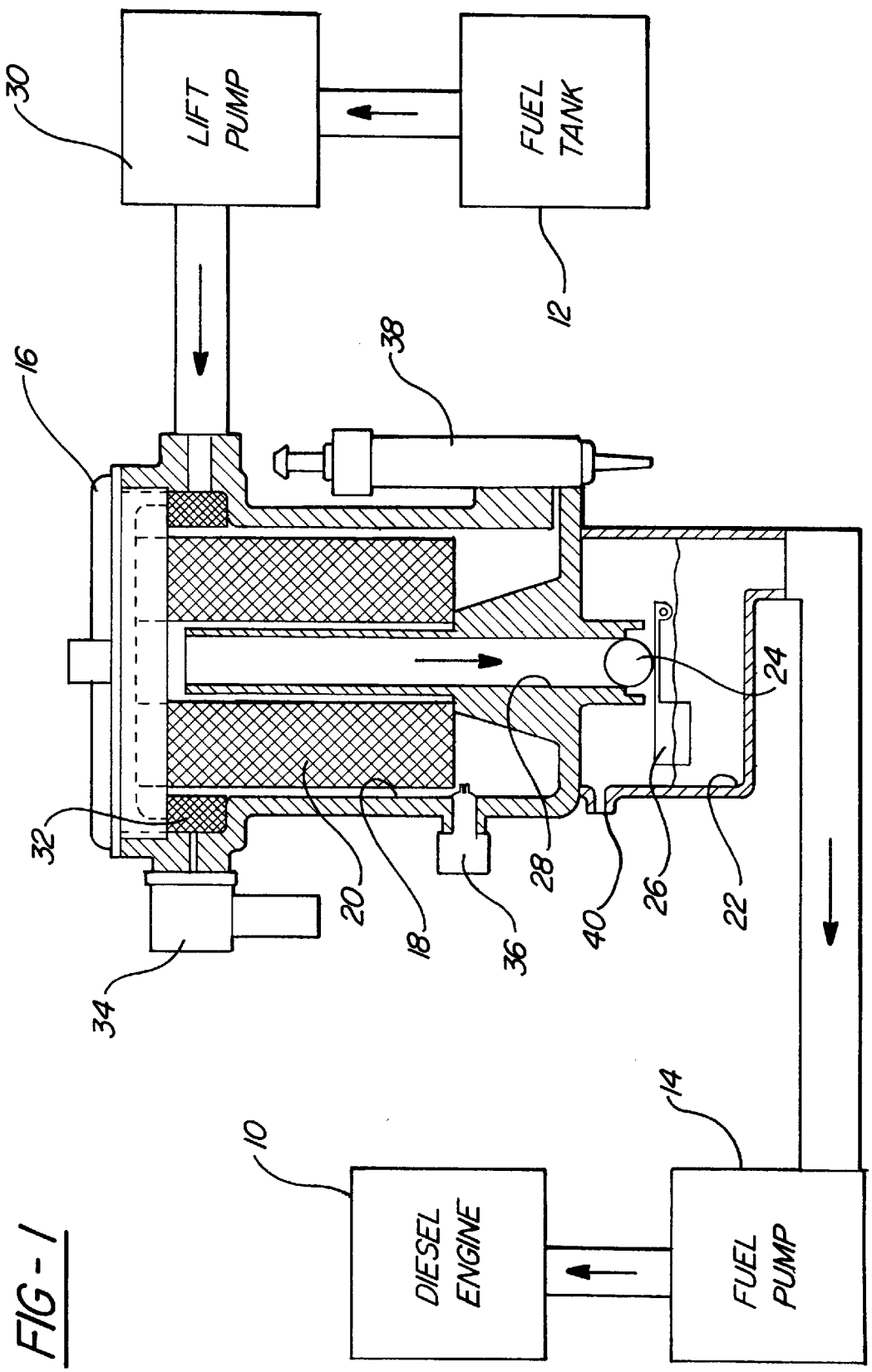

Referring to the Figures, wherein like numerals indicate like or corresponding parts throughout the several views, an internal combustion engine and fuel supply system is generally shown in the drawing and includes an internal combustion engine 10, a fuel tank 12 for storing and supplying fuel to the engine 10, and a fuel line for conveying fuel from fuel tank 12 to the engine 10.

An injector pump 14 is disposed in the fuel line for pumping fuel from the fuel tank 12 to the engine 10. A housing 16 defines a filter chamber 18 which supports a fuel filter material 20 in the fuel line between the fuel tank 12 and the injector pump 14. The housing 16 also defines a fuel reservoir 22 in the fuel line between the filter material 20 and the injector pump 14 for storing a volume of fuel. The housing 16 consists of two parts with the reservoir 22 being defined by a stamping-like or plastic or cast of metal shell secured by fasteners to the main body cast of metal or molded of plastic. The filter chamber 18 is therefore disposed above the reservoir 22 to support the filter material 20 in the chamber 18 above the reservoir 22 whereby fuel flows under the force of gravity from the filter chamber 18 to the reservoir 22.

The system is characterized by a valve 24, such as a ball, controlling fuel flow between or through the filter material 20 in the filter chamber 18 and the reservoir 22 for maintaining a predetermined volume of fuel in the reservoir 22 to provide a substantially constant fuel pressure to the injector pump 14. A float 26 is included for opening the valve 24 in response to the fuel being below the predetermined volume and closing the valve 24 in response to the fuel being above the predetermined volume. More specifically, the housing 16 includes a passage 28 extending from a bottom end upwardly through the filter material 20 to a top end adjacent the top of the filter material 20 and the valve 24 is disposed at the bottom end of the passage 28. As noted above, the valve 24 comprises a ball for opening and closing the bottom end of the passage 28.

The system also includes a lift pump 30 in the fuel line between the fuel tank 12 and the filter chamber 18. However, in order to maintain a constant pressure on the injector pump 14, the reservoir 22 is ideally within +/- one foot of the injector pump 14, preferably no lower than the injector pump 14. Fuel flows to the filter chamber 18 and reservoir 22 by pressure created by the lift pump 30.

The housing 16 supports a heating element 32 for heating waxed fuel and electrical connector and thermostat 34 for the heater 32. The housing 16 also supports a water sensor 36 for detecting a maximum level of moisture in the fuel. A drain valve 38 is supported on the housing for draining accumulated water from the filter chamber 18. The reservoir 22 is fabricated with an integral vent hole 40 for venting air into and out of the reservoir 22.

Although not shown, the system would include a fuel return line from the diesel engine 10 back to the fuel tank 12, as is well known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An internal combustion engine (10) and fuel supply system comprising;

a fuel tank (12) for storing and supplying fuel to said engine (10), a fuel line for conveying fuel from said fuel tank (12) to said engine (10), an injector pump (14) in said fuel line for pumping fuel from said fuel tank (12) to said engine (10), a fuel filter material (20) in said fuel line between said filter material (20) and said injector pump (14) for storing a volume of fuel;

a housing (16) defining a filter chamber (18) disposed above said reservoir (22), said filter material (20) supported in said chamber (18) above said reservoir (22) whereby fuel flows under the force of gravity from said filter chamber (18) to said reservoir (22), a valve (24) controlling fuel flow between said filter material (20) and said reservoir (22) for maintaining a predetermined volume of fuel in said reservoir (22) to provide a substantially constant fuel pressure to said injector pump (14).

2. A system as set forth in claim 1 including a float (26) for opening said valve (24) in response to said fuel being below said predetermined volume and closing said valve (24) in response to said fuel being above said predetermined volume.

3. A system as set forth in claim 2 including a housing (16) defining a filter chamber (18) disposed above said reservoir (22), said filter material (20) supported in said chamber (18) above said reservoir (22) whereby fuel flows under the force of gravity from said filter chamber (18) to said reservoir (22).

4. A system as set forth in claim 2 wherein said housing (16) includes a passage (28) extending from a bottom end upwardly through said filter material (20) to a top end, said valve (24) being disposed at said bottom end of said passage (28).

5. A system as set forth in claim 4 wherein said reservoir (30) is at least vertically level with said injector pump (14).

6. A system as set forth in claim 4 including a lift pump (14) in said fuel line between said fuel tank (12) and said filter chamber (18).

7. A system as set forth in claim 4 wherein said valve (24) comprises a ball for opening and closing said bottom end of said passage (28).

8. A fuel filter assembly for a fuel system for an internal combustion engine, said assembly comprising;

a fuel filter housing (16) defining a filter chamber (18) for disposition in a fuel line between a fuel tank (12) and an injector pump (14), a filter material (20) supported in said filter chamber (18) of said housing (16), a fuel reservoir (22) disposed below said filter chamber (18) for storing a volume of fuel;

said assembly characterized by a valve (24) controlling fuel flow between said filter chamber (18) and said reservoir (22) for maintaining a predetermined volume of fuel in said reservoir (22) to provide a substantially constant fuel pressure to the injector pump (14).

9. An assembly as set forth in claim 8 including a float (26) for opening said valve (24) in response to said fuel being below said predetermined volume and closing said valve (24) in response to said fuel being above said predetermined volume.

10. An assembly as set forth in claim 9 wherein said filter material (20) is supported in said chamber (18) above said reservoir (22) whereby fuel flows under the force of gravity from said filter chamber (18) to said reservoir (22).

11. An assembly as set forth in claim 10 wherein said housing (16) includes a passage (28) extending from a bottom end upwardly through said filter material (20) to a top end, said valve (24) being disposed at said bottom end of said passage (28).

12. An assembly as set forth in claim 11 wherein said valve (24) comprises a ball for opening and closing said bottom end of said passage (28).

* * * * *